US009161402B2

United States Patent
Kim et al.

(10) Patent No.: US 9,161,402 B2
(45) Date of Patent: *Oct. 13, 2015

(54) HIGH PERFORMANCE ADAPTIVE SWITCHED LED DRIVER

(71) Applicant: Dialog Semiconductor Inc., Campbell, CA (US)

(72) Inventors: Minjong Kim, San Jose, CA (US); Enzhu Liang, Pacifica, CA (US); Xuecheng Jin, Palo Alto, CA (US)

(73) Assignee: Dialog Semiconductor Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/231,485

(22) Filed: Mar. 31, 2014

(65) Prior Publication Data

US 2014/0210365 A1    Jul. 31, 2014

Related U.S. Application Data

(63) Continuation of application No. 13/314,103, filed on Dec. 7, 2011, now Pat. No. 8,710,753.

(51) Int. Cl.
*H05B 33/08*      (2006.01)
*H05B 37/02*      (2006.01)

(52) U.S. Cl.
CPC ........ *H05B 33/0815* (2013.01); *H05B 33/0824* (2013.01); *H05B 37/02* (2013.01)

(58) Field of Classification Search
CPC ........... H05B 33/0815; H05B 33/0824; H05B 33/0809; H05B 33/0812; H05B 33/0836; H05B 33/0839; H05B 33/0842; H05B 33/0881
USPC ............................... 315/122, 185 R, 186, 307
See application file for complete search history.

(56) References Cited

U.S. PATENT DOCUMENTS 6,577,512 B2    6/2003   Tripathi et al.
6,586,890 B2    7/2003   Min et al.
(Continued)

FOREIGN PATENT DOCUMENTS

CN     100477869 C     4/2009
JP     2006-318337 A   11/2006
(Continued)

OTHER PUBLICATIONS

Korean Intellectual Property Office, Office Action, Korean Application No. 10-2012-0138746, Apr. 25, 2014, 10 pages.
Korean Intellectual Property Office, Office Action, Korean Application No. 10-2012-0138746, Oct. 7, 2014, 4 pages.
(Continued)

*Primary Examiner* — Vibol Tan
(74) *Attorney, Agent, or Firm* — Fenwick & West LLP

(57) ABSTRACT

An LED driver controls current through an LED string. The LED driver generates a boosted PWM signal to drive a PWM transistor in the LED current path such that the PWM transistor maintains a substantially constant $V_{GS}$, thus minimizing turn-on impedance of the PWM transistor. A current mirror circuit controls peak LED current when the PWM transistor is on. A trimming circuit includes a set of programmable switches to couple or decouple trimming transistor from the LED current path, and allowing for fine calibration of the LED current. By maintaining a low resistance and compensating for current mismatch in the LED current path, the LED driver provides efficient power performance and robustness that is particularly beneficial in high current applications.

20 Claims, 3 Drawing Sheets

(56) References Cited

U.S. PATENT DOCUMENTS

| | | | |
|---|---|---|---|
| 6,864,641 B2 * | 3/2005 | Dygert | 315/216 |
| 7,256,554 B2 | 8/2007 | Lys | |
| 7,262,559 B2 | 8/2007 | Tripathi et al. | |
| 7,286,123 B2 | 10/2007 | Yang | |
| 7,358,679 B2 | 4/2008 | Lys et al. | |
| 7,737,643 B2 | 6/2010 | Lys | |
| 7,777,704 B2 | 8/2010 | S et al. | |
| 7,928,670 B2 * | 4/2011 | Chen et al. | 315/308 |
| 8,334,662 B2 * | 12/2012 | Jin et al. | 315/299 |
| 8,917,031 B2 * | 12/2014 | Xiao | 315/294 |
| 2007/0205823 A1 | 9/2007 | Cho | |
| 2009/0137282 A1 | 5/2009 | Otaka | |
| 2009/0230881 A1 | 9/2009 | Chen et al. | |
| 2011/0037407 A1 | 2/2011 | Ahn et al. | |

FOREIGN PATENT DOCUMENTS

| | | |
|---|---|---|
| JP | 2007-317933 A | 12/2007 |
| JP | 2009-124027 A | 6/2009 |
| KR | 10-2011-0017784 A | 2/2011 |

OTHER PUBLICATIONS

State Intellectual Property Office of the People's Republic of China, First Office Action, Chinese Patent Application No. 201210543808.5, Jul. 2, 2014, twelve pages.

United States Office Action, U.S. Appl. No. 13/314,103, Oct. 10, 2013, five pages.

United States Office Action, U.S. Appl. No. 13/314,103, Jun. 26, 2013, seven pages.

* cited by examiner

HIGH PERFORMANCE ADAPTIVE SWITCHED LED DRIVER

CROSS REFERENCE TO RELATED APPLICATIONS

This application is a continuation of U.S. application Ser. No. 13/314,103, filed Dec. 7, 2011, which is incorporated by reference in its entirety.

BACKGROUND

1. Field of the Invention

The present invention relates to an LED (light-emitting diode) driver and, more specifically, to an LED driver for high current mode applications.

2. Description of the Related Arts

LEDs are being adopted in a wide variety of electronics applications, for example, architectural lighting, automotive head and tail lights, backlights for liquid crystal display devices including personal computers and high definition TVs, flashlights, etc. Compared to conventional lighting sources such as incandescent lamps and fluorescent lamps, LEDs have significant advantages, including high efficiency, good directionality, color stability, high reliability, long life time, small size, and environmental safety.

A common application for LEDs is in backlighting Liquid Crystal Displays (LCDs). In these applications, a large number of LED strings are typically used (e.g., 64 LED channels), with each string driven by an LED driver. In a conventional LED driver architecture, a fixed resistor in the LED power path limits peak current through the LED string. A PWM-controlled transistor in the LED power path controls the on and off times of the LEDS to achieve a desired brightness.

A problem with the conventional LED driver architecture is that the overall power consumption can be undesirably high. Generally, the power consumption, $PWR_n$, in an LED string, n, is given by:

$$PWR_n = VLED_n \times ILED_n \quad (1)$$

where $VLED_n$ is the voltage across LED string n and $ILED_n$ is the current through LED string n. The total power consumption $PWR_{total}$ of a circuit having N LED channels is given by:

$$PWR_{total} = \sum_{n=1}^{N} PWR_n \quad (2)$$

The LED voltage $VLED_n$ (and therefore the power consumption $PWR_n$) in an LED string is a function of the resistance of the fixed resistor in the LED power path and the turn-on impedance of the PWM transistor. Because the turn-on impedance of the PWM transistor increases as LED current increases, the overall power consumption becomes particularly high in high current mode applications such as 3D mode or scan mode operation for LCDs, where the LED current $ILED_n$ can rise up to, for example, 450 mA with a 20% duty cycle. In conventional LED driver architectures, operating at these current levels can create thermal problems in the LED driver chip due to the high power consumption. The problem can be further exacerbated by poor ground noise rejection associated with some conventional LED driver architectures, thereby limiting overall performance and robustness.

SUMMARY

An embodiment includes an LED driver applying a boosted Pulse Width Modulation (PWM) signal to a first transistor controlling current through an LED string in order to maintain a gate-source voltage of the first transistor at a substantially constant value. In one embodiment, the LED driver drives an LED string coupled in series with the first transistor. An LED controller is configured to generate a PWM signal. A boosted PWM generator generates a boosted PWM signal based on the PWM signal. The boosted PWM signal drives the first transistor to turn the first transistor on or off. The boosted PWM signal has an amplitude that rises and falls with a source voltage of the first transistor when the first transistor is turned on. The gate-source voltage of the PWM transistor is therefore maintained at a substantially constant voltage.

In one embodiment, a current mirror circuit receives a seed current set by the LED controller and controls an LED current through the first transistor and the LED string when the PWM transistor is turned on. The LED current varies with the seed current.

In one embodiment, a programmable trimming circuit is coupled to the current mirror circuit. The programmable trimming circuit is configured to generate a portion of the LED current that is substantially proportional to the seed current. The portion of the LED current generated by the programmable trimming circuit is controlled by one or more programmable trimming bits.

Beneficially, the LED driver provides an LED current path with relatively low resistance compared to conventional architectures, thus providing good power efficiency. Furthermore, the trimming circuit can be programmed to compensate for manufacturing variations between transistors, thereby improving ground noise rejection and reducing current mismatch compared to conventional architectures.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

DETAILED DESCRIPTION OF EMBODIMENTS

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

In general, an LED driver controls LED current through an LED string. A LED controller provides a current control signal that sets the peak current through an LED current path. A current mirror circuit controls current without requiring any fixed sense resistor in the LED current path. A boosted PWM generator drives a PWM transistor to control brightness of the LED string. The boosted PWM generator boosts a PWM signal by a source voltage $V_S$ of the PWM transistor so that the PWM transistor operates with a substantially constant gate-source voltage $V_{GS}$ maintained at approximately the power supply voltage $V_{DD}$. An LED trimming circuit includes one or more programmable trimming transistors that finely calibrate the LED current to account for manufacturing variations between transistors. Overall, the described LED driver provides improved power efficiency and ground noise rejection compared to traditional architectures, which is particularly beneficial for high current applications such as 3D mode and scan mode LED backlight applications.

LED Driver Architecture

Figure 1:
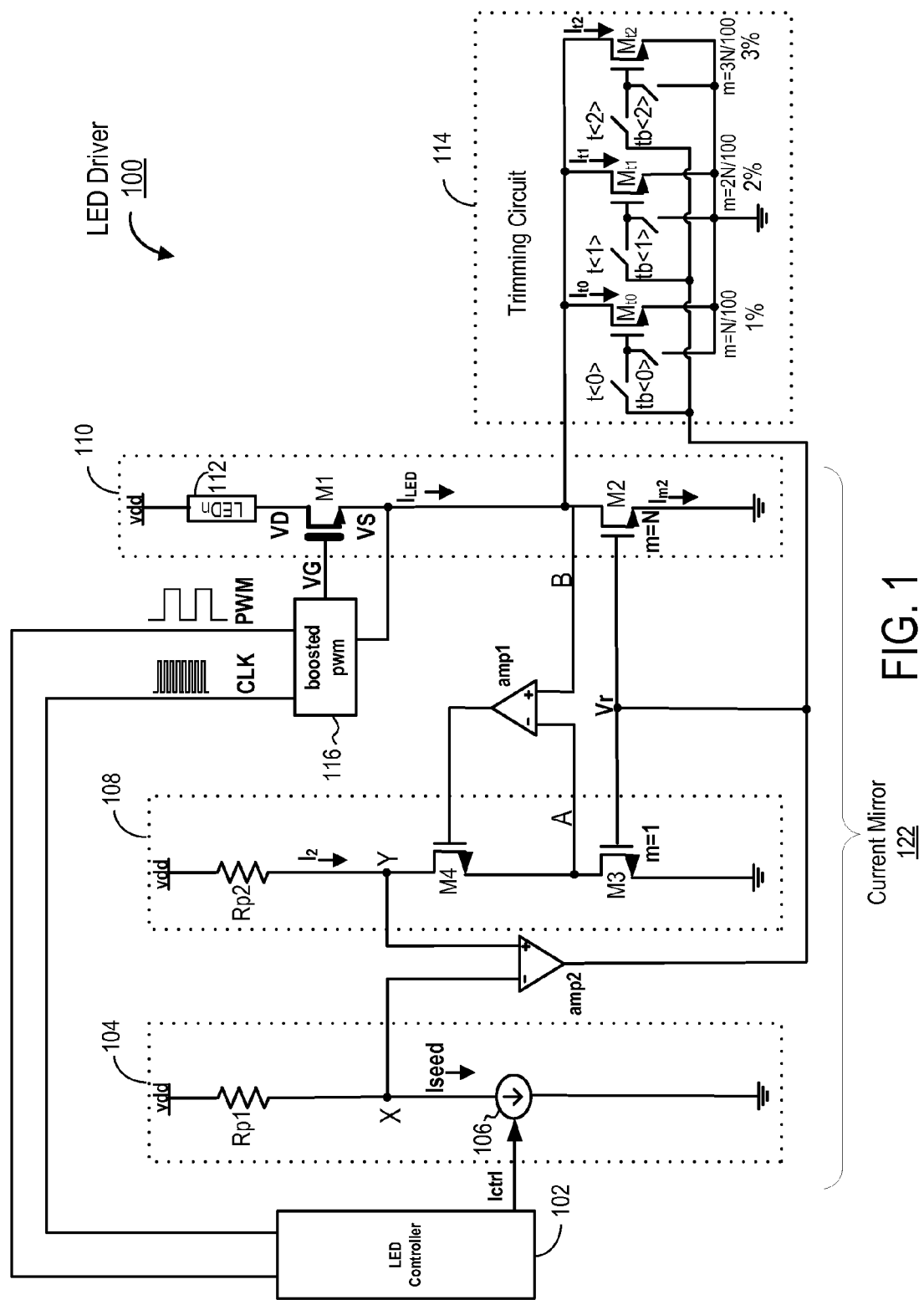
FIG. 1 is a circuit diagram illustrating an embodiment of an LED driver circuit.

FIG. 1 is a circuit diagram of a first embodiment of an LED driver 100 driving LED string 112. LED driver 100 comprises LED controller 102, PWM transistor M1 driven by boosted PWM generator 116, trimming circuit 114, and a current mirror circuit 122 collectively comprised of first current path 104, second current path 108, LED current path 110, and amplifiers amp1, amp2. Alternative embodiments may include additional components omitted from FIG. 1 for clarity of description.

LED controller 102 outputs digital control signals PWM, CLK, and ictrl. PWM and CLK signals are outputted to boosted PWM generator 116 and used to control brightness of LED string 112 as will be described in further detail below. ictrl is a current control signal that indirectly controls peak current through LED string 112 via current mirror circuit 122. In one embodiment, ictrl controls a current source 106 to set a seed current Iseed through first current path 104. Iseed and the value of resistor Rp1 collectively determine the voltage at node X. Particularly, as Iseed increases, the voltage drop across resistor Rp1 increases, and the voltage at node X decreases (and vice versa).

In second current path 108, resistor Rp2, transistor M4, and transistor M3 are coupled in series. Amplifier Amp2 amplifies the difference in voltages between node X and node Y and generates reference voltage Vr which controls the gate of transistor M3. In operation, this feedback loop serves to sense voltage X and adjust voltage Y proportionally. For example, as voltage X increases with respect to voltage Y, Vr decreases. This reduces current $I_2$ through second current path 108, thereby lowering the voltage drop across resistor Rp2 and increasing the voltage at node Y. If Rp1 and Rp2 have equal resistance, the feedback loop will maintain voltage Y at the same level as voltage X. Thus, Iseed will be copied to second current path 108 such that $I_2$=Iseed. In alternative embodiments, Rp1 and Rp2 may have different resistance values. In these embodiments, voltage Y will move proportionally to voltage X and current $I_2$ will move proportionally to Iseed with a gain dependent on the ratio between Rp1 and Rp2.

In LED current path 110, high voltage transistor M1 and transistor M2 are coupled in series with LED string 112. Operational amplifier amp1 amplifies the difference of the drain voltages of transistors M3 and M2 (voltages at nodes A and B respectively), and the amplified output drives the gate of transistor M4 in second current path 108. When the PWM is off (i.e., $V_G$ is low), transistors M1 turns off and stops the flow of LED current $I_{LED}$, which in turn causes transistor M4 to turn off and shuts down the feedback loops. When the PWM is on (i.e., $V_G$ is high), the LED current $I_{LED}$ flows through transistors M1 and M2. Amplifier amp1 senses the voltage at node B and controls transistor M4 so that the voltage at node A matches the voltage at node B. Transistor M2 shares gate voltage Vr with transistor M3. Thus, because transistor M2 has the same drain, source, and gate voltages as transistor M3, current $I_{M2}$ through transistor M2 will move proportionally to current $I_2$ through M3 when the PWM is on. The current gain of the current mirror depends on manufacturing variations between M2 and M3. For example, by varying the widths and/or lengths of the transistors, a different gain factor, m, can be achieved. Thus, for example, if transistor M3 has a gain factor of m=1 and transistor M2 has a gain factor of m=N, then current $I_{M2}$ through transistor M2 is given by $I_{M2}=N*I_2$. In one embodiment, for example, N≈1000 allowing LED driver 100 to control $I_{LED}$ using only very low currents (and low power) through currents paths 104 and 108.

Trimming Circuit

Trimming circuit 114 allows for fine calibration of $I_{LED}$ to account for ground noise and manufacturing variations between transistors. In one embodiment, trimming circuit 114 comprises one or more trimming transistors each independently turned on or off by a calibration bit. In one embodiment, the calibration bits can be permanently programmed during a testing stage following manufacture of LED driver 100.

In the illustrated embodiment, a three bit trimming circuit 114 is used comprising three trimming transistors $M_{t0}$, $M_{t1}$, $M_{t2}$. The sources and drains of each of the trimming transistors are coupled to the source and drain respectively of transistor M2. Each trimming transistor is controlled by a pair of switches that couple or decouple the trimming transistors from LED current path 110 depending on the corresponding calibration bit. For example, when calibration bit 0 is asserted, switch t<0> closes and switch tb<0> opens, thus coupling the gate of trimming transistor $M_{t0}$ to reference voltage Vr. As a result, current $I_{t0}$ flows through trimming transistor $M_{t0}$. Conversely, when calibration bit 0 is not asserted, switch t<0> opens and switch tb<0> closes, thus coupling the gate of trimming transistor $M_{t0}$ to ground, effectively reducing current $I_{t0}$ to zero. Switches t<1> and tb<1> operate similarly to control transistor $M_{t1}$ based on calibration bit 1, and switches t<2> and tb<2> operate similarly to control transistor $M_{t2}$ based on calibration bit 2.

Thus, when a calibration bit is set, the corresponding trimming transistor becomes coupled in parallel with transistor M2, having the same drain, source, and gate voltages. Therefore, $I_{LED}$ can be increased by setting the various calibration bits. The overall LED current is given by $I_{LED}=I_{m2}+I_{t0}+I_{t1}+I_{t2}$. The amount of current flowing through each trimming transistor that is turned on will be proportional to the current through M2 and dependent on the gain factor of the trimming transistors.

In the illustrated embodiment, a first trimming transistor $M_{t0}$ has a gain factor of m=N/100, thus increasing $I_{LED}$ by 1% when toggled on. A second trimming transistor $M_{t1}$ has a gain factor of m=2N/100, thus increasing $I_{LED}$ by 2% when toggled on. A third trimming transistor $M_{t2}$ has a gain factor of m=3N/100, thus increasing $I_{LED}$ by 3% when toggled on. By toggling on or off different combinations of trimming bits, $I_{LED}$ can be increased anywhere from 0-6% in 1% increments. In alternative embodiments, a different calibration range or level of precision can be achieved by varying the number of calibration bits used and/or by varying the gain factors m of the trimming transistors.

In one embodiment, the trimming switches t<0>, tb<0>, t<1>, tb<1>, t<2>, tb<2> can be implemented using a one-time programmable memory component such as a polyfuse. These switches may be programmed based on calibration results observed during a testing stage of LED driver 100.

Boosted PWM Controller

Boosted PWM controller 116 receives Pulse Width Modulation signal PWM and clock signal CLK from LED controller 102 and senses source voltage Vs of PWM transistor M1. LED controller 102 varies the duty cycle of PWM to achieve a desired brightness of LED string 112. Boosted PWM controller 116 generates a boosted PWM signal as a gate voltage $V_G$ to drive PWM transistor M1. $V_G$ has a duty cycle identical or substantially similar to PWM, but is boosted in amplitude by $V_S$ and varies continuously with $V_S$ when PWM is asserted. By varying $V_G$ with $V_S$, it is ensured that $V_{GS}$ of transistor M1 is maintained at a substantially constant voltage of $V_{dd}$.

The turn-on impedance of transistor M1 is given by:

$$RH = \frac{1}{\mu_n C_{ox}\left(\frac{W}{L}\right)(Vg - Vs - V_{th})} \quad (3)$$

where $\mu_n$ is the electron mobility, $C_{ox}$ is the oxide capacitance, $V_{th}$ is the turn on threshold voltage, W is the gate width, and L is the gate length. $\mu_n$, $C_{ox}$, $V_{th}$, W, and L are all constants defined through the manufacturing or design processes. Thus, the turn-on impedance is inversely proportional to $V_{GS}=V_G-V_S$. Therefore, by using boosted PWM controller 116 to maintain $V_{GS}$=Vdd, the turn-on impedance of transistor M1 is minimized, thereby providing improved power efficiency over a traditional LED driver architecture without a boosted PWM.

Figure 2:
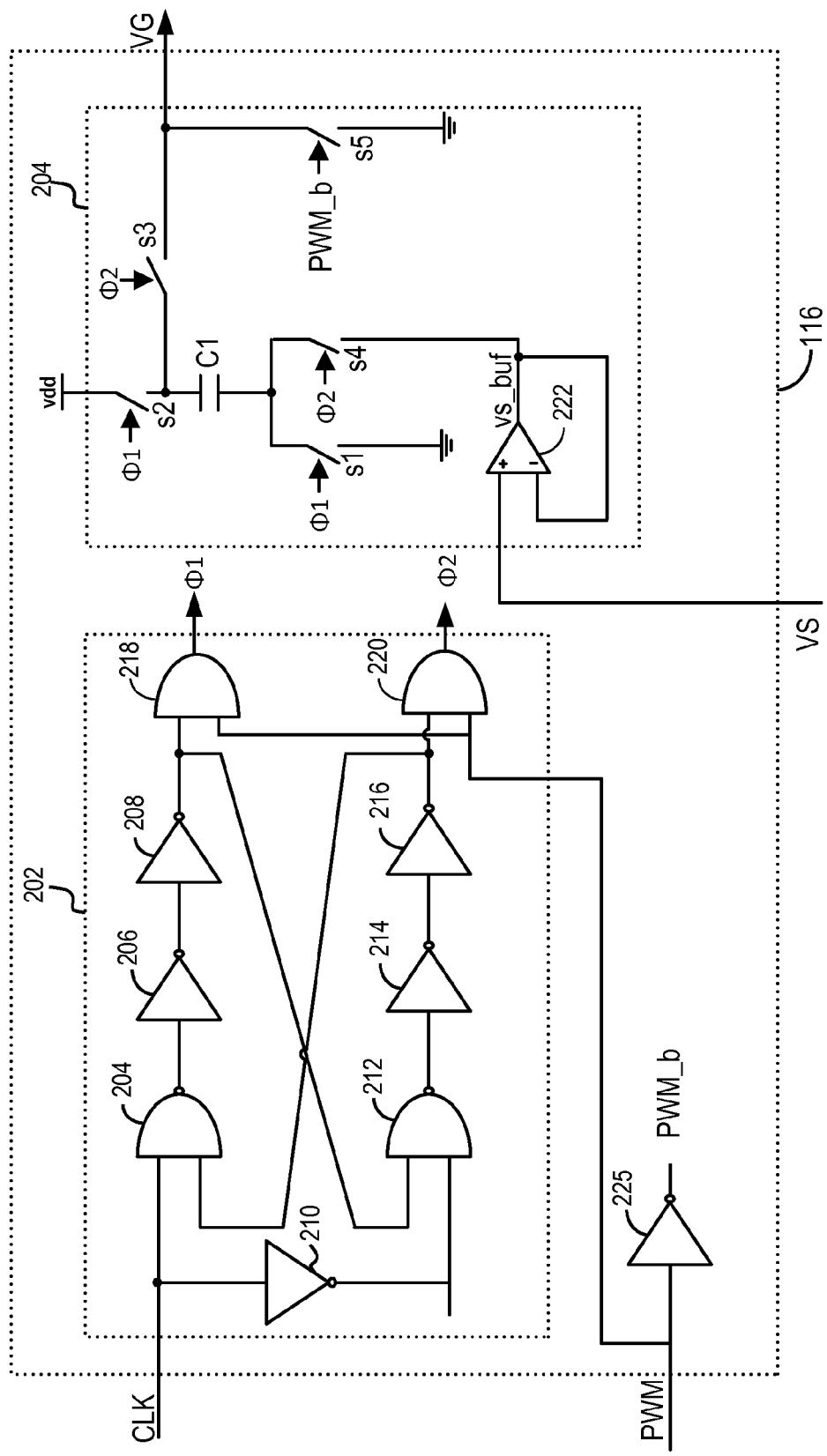
FIG. 2 is a circuit diagram illustrating an embodiment of a boosted PWM circuit.

FIG. 2 illustrates an example embodiment of boosted PWM controller 116. In one embodiment, boosted PWM controller 116 comprises clock generator circuit 202 and boosting circuit 204. Furthermore, inverter 225 generates an inverted PWM signal PWM$_{\_b}$ from PWM.

Clock generator circuit 202 receives an input clock CLK and generates first output clock signal Φ1 and second output clock Φ2 that are non-overlapping when PWM is asserted (i.e., Φ2 is never asserted when Φ1 is asserted and vice versa) and are low when PWM is low. An embodiment of clock generator circuit 202 can be implemented using standard logic gates. For example, in one embodiment, CLK and output of inverter 216 are coupled to the inputs of NAND gate 204. The output of NAND gate 204 is coupled to inverters 206, 208 arranged in series. The output of inverter 208 is masked by AND gate 218 with PWM so that output Φ1 is low when PWM is low and follows the output of inverter 208 when PWM is asserted. CLK is also inverted by NOT gate 210. The inverted CLK signal and the output of inverter 208 are coupled to the inputs of NAND gate 212. The output of NAND gate 212 is coupled to inverters 214, 216 arranged in series. The output of inverter 216 is masked by AND gate 220 so that output Φ2 is low when PWM is low and follows the output of inverter 216 when PWM is asserted.

When CLK is low, the output of NAND gate 204 and output of inverter 208 must be high, thus causing Φ2 to go low (if PWM is asserted). Conversely, when CLK is high, the output of NAND gate 212 and output of inverter 216 must be high, thus causing Φ1 to go low (if PWM is asserted). As a result, Φ1 follows CLK and Φ2 follows an inverted CLK when PWM is asserted, with the signals phase shifted from CLK based on logic delay. Thus, Φ1 and Φ2 have the same frequency when PWM is asserted, and the on-times of Φ2 are non-overlapping with the on-times of Φ1. In alternatively embodiments, different implementations of clock generator 202 may be used.

Boosting circuit 204 utilizes Φ1 and Φ2 to generate boosted PWM output signal $V_G$ based on PWM$_{\_b}$ and Vs. Boosting circuit 204 comprises a set of switches s1, s2, s3, s4, s5, a capacitor C1, and an operational amplifier 222. When Φ1 is asserted (and Φ2 is therefore low), switches s1 and s2 close, and switches s3 and s4 open. This couples capacitor C1 between Vdd and ground, thus charging C1 and producing a voltage of Vdd across C1. When Φ1 goes low (and Φ2 is therefore asserted), switches s1 and s2 open, and switches s3 and s4 close. Operation amplifier 222 is configured as a voltage follower (i.e., a buffer) to buffer $V_S$ and outputs buffered voltage vs_buf that follows Vs. Capacitor C1 therefore becomes coupled between vs_buf and output voltage $V_G$. Buffered voltage Vs_buf is added to the voltage Vdd across capacitor C1, yielding a boosted output $V_G$=Vdd+Vs, assuming switch s5 is open (i.e., when PWM is high). When PWM$_{\_b}$ is asserted (PWM is low), switch s5 closes and $V_G$ drops to zero. Thus, $V_G$ follows the same duty cycle as PWM, but the amplitude is boosted to $V_G+V_S$ when PWM is asserted.

Figure 3:
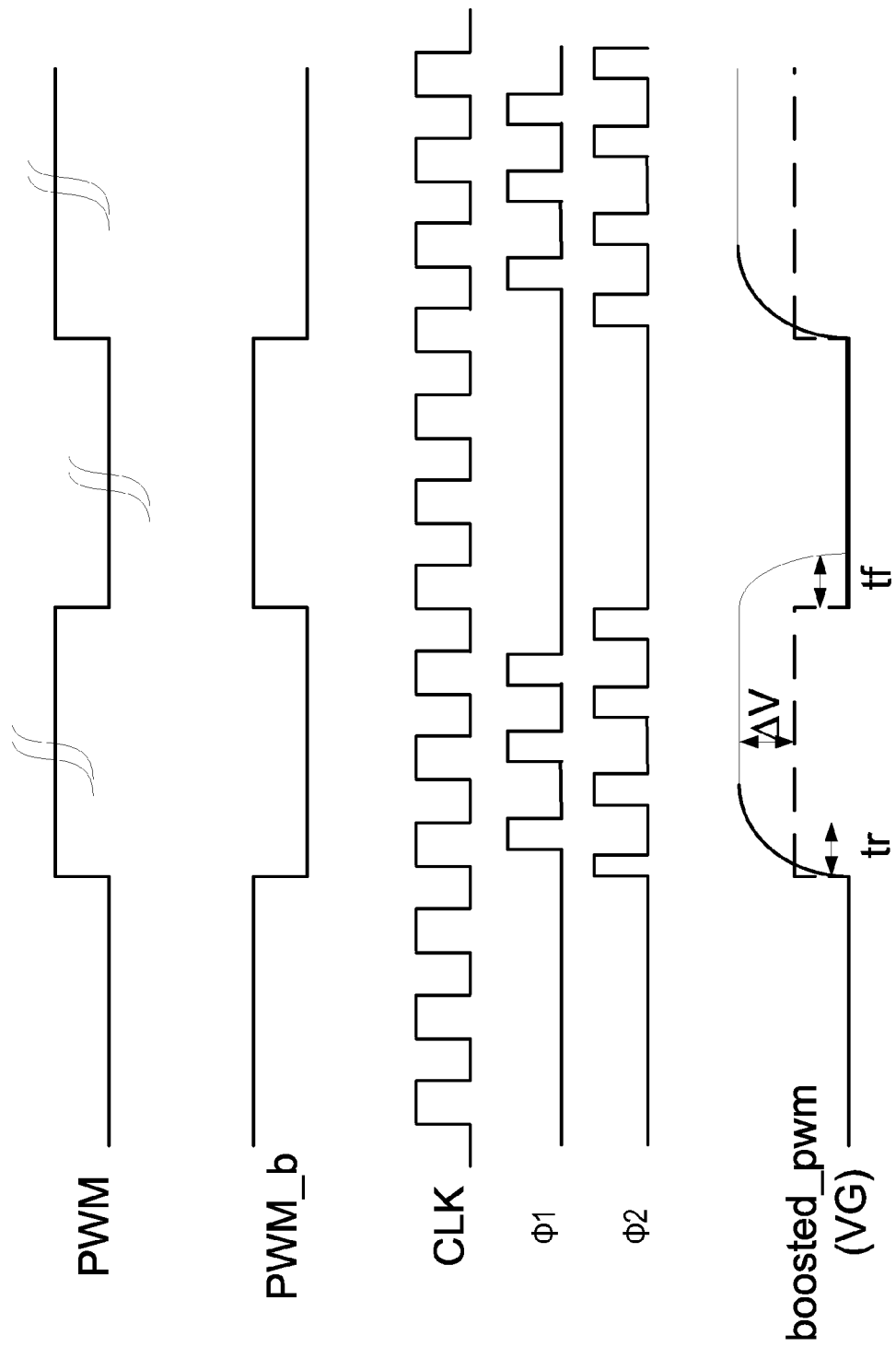
FIG. 3 is a waveform diagram illustrating operation of the boosted PWM circuit, according to one embodiment.

FIG. 3 illustrates waveform diagrams showing operation of boosted PWM generator 116. Illustrated are signals PWM, PWM_b, CLK, Φ1, Φ2, and $V_G$. As can be seen, Φ1 and Φ2 are non-overlapping clock signals generated from CLK. The boosted PWM signal $V_G$ at the gate of transistor M1 has a duty cycle that approximately follows PWM, but the amplitude is boosted by $\Delta V=V_S$. The rise time $t_r$ and fall time $t_f$ of $V_G$ generally decreases as the frequency of CLK increases relative to the frequency of PWM. These parameters can be adjusted depending on the desired performance characteristics of LED driver 100.

The above-described LED driver provides several advantages over conventional architectures. First, by utilizing a current mirror configuration to control LED current, the LED driver can operate without any fixed resistor in the LED current path. This reduces resistance through the LED current path and improves overall power efficiency. Second, by employing a boosted PWM generator to drive the PWM transistor, the PWM transistor operates with a substantially constant $V_{GS}$ maintained at approximately $V_{DD}$. This improves this turn-on impedance of the PWM transistor, further reducing overall power consumption. Third, the LED driver includes an LED trimming circuit that allows for fine calibration of the LED current. The trimming circuit can be programmed during a calibration stage to account for manufacturing variations between transistors. This reduces current mismatch and improves ground noise rejection of the LED driver. The described LED driver architecture is particularly useful in high current applications because the LED driver can avoid thermal issues associated with conventional architectures based on its improved power efficiency.

Upon reading this disclosure, those of skill in the art will appreciate still additional alternative designs for the LED driver. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A light-emitting diode (LED) driver for driving an LED string, the LED driver comprising:
    an LED controller configured to generate a PWM signal;
    a first transistor to turn on or off responsive to the PWM signal, the first transistor in series with the LED string, wherein an LED current passes through the first transistor and the LED string when the first transistor is turned on;
    a second transistor in series with the LED string and the first transistor, wherein a first portion of the LED current passes through the second transistor when the first transistor is turned on;
    a programmable trimming circuit in parallel with the second transistor, the programmable trimming circuit configured to pass a trimming circuit current controlled by one or more trimming control signals, wherein the trimming circuit current comprises a second portion of the LED current.

2. The LED driver of claim 1, wherein the programmable trimming circuit comprises:
    a first switch controllable by a first trimming control signal; and
    a first trimming transistor configured to conduct at least a first portion of the trimming circuit current when the first switch is closed, and the first trimming transistor is configured to turn off when the first switch is open.

3. The LED driver of claim 2, wherein the programmable trimming circuit further comprises:
    a second switch controllable by the first trimming control signal, the second switch configured to close when the first switch is opened, and the second switch configured to open when the first switch is closed, wherein the second switch is configured to turn off the first trimming transistor when the second switch is closed.

4. The LED driver of claim 2, wherein the programmable trimming circuit further comprises:
    a third switch controllable by a second trimming control signal; and
    a second trimming transistor configured to conduct a least a second portion of the trimming circuit current when the third switch is closed, and configured to turn off when the third switch is opened.

5. The LED driver of claim 4, wherein the second portion of the trimming circuit current is larger than the first portion of the trimming circuit current.

6. The LED driver of claim 4, wherein the second portion of the trimming circuit current is approximately twice the first portion of the trimming circuit current.

7. The LED driver of claim 2, wherein the first switch is a one-time programmable memory component.

8. The LED driver of claim 2, further comprising;
    a current mirror circuit receiving a seed current set by the LED controller and controlling the LED current through the first transistor and the LED string;
    wherein the first portion of the LED current through the second transistor is substantially proportional to the seed current; and
    wherein the trimming circuit current is substantially proportional to the seed current.

9. The LED driver of claim 8, wherein the current mirror is further configured to generate a reference voltage based on the seed current and wherein the first portion of the LED current and the trimming circuit current are based on the reference voltage.

10. The LED driver of claim 8 wherein the current mirror comprises an operational amplifier to generate an output representing a difference between a sensed voltage representative of the seed current and a mirror current voltage representative of a mirror current of the current mirror circuit, wherein an output of the operational amplifier is coupled to the gate of the second transistor and the first switch.

11. A method for driving a first transistor coupled in series with an LED string, the method comprising:
    generating a PWM signal by an LED controller;
    turning a first transistor on or off responsive to the PWM signal, the first transistor in series with the LED string, wherein an LED current passes through the first transistor and the LED string when the first transistor is turned on;
    passing a first portion of the LED current through a second transistor when the first transistor is turned on, the second transistor in series with the first transistor;
    passing a trimming circuit current controlled by one or more trimming control signals, the trimming circuit current comprising a second portion of the LED current.

12. The method of claim 11, wherein generating the portion of the LED current comprises:
    controlling a first switch based on a first trimming control signal; and
    conducting a first portion of the trimming circuit current through a first trimming transistor when the first switch is closed; and
    turning off the first trimming transistor responsive to the first switch being open.

13. The method of claim 12, wherein generating the portion of the LED current further comprises:
    closing a second switch responsive to opening the first switch and opening the second switch responsive to closing the first switch; and
    turning off the first trimming transistor responsive to closing the second switch.

14. The method of claim 12, wherein generating the portion of the LED current further comprises:
    controlling a third switch based on a second trimming control signal; and
    conducting a second portion of the trimming circuit current through a second trimming transistor when the third switch is closed; and
    turning off the second trimming transistor responsive to the third switch being open.

15. The method of claim 14, wherein the second portion of the trimming circuit current is larger than the first portion of the trimming circuit current.

16. The method of claim 14, wherein the second portion of the trimming circuit current is approximately twice the first portion of the trimming circuit current.

17. The method of claim 12, wherein the first switch is a one-time programmable memory component.

18. The method of claim 12, further comprising:
receiving a seed current set by an LED controller and controlling the LED current through the first transistor and the LED string based on the seed current; and
wherein the first portion of the LED current through the second transistor is substantially proportional to the seed current; and
wherein the trimming circuit current is substantially proportional to the seed current.

19. The method of claim 18, further comprising:
generating a reference voltage based on the seed current;
controlling the second transistor based on the reference voltage; and
responsive to the first switch being closed, controlling the first trimming transistor based on the reference voltage.

20. The method of claim 11, wherein generating the portion of the LED current comprises:
increasing the LED current by a first fixed percentage when a first trimming control signal is asserted; and
increasing the LED current by a second fixed percentage when a second trimming control signal is asserted.

* * * * *